United States Patent [19]

Kossor

[11] Patent Number: 4,683,583
[45] Date of Patent: Jul. 28, 1987

[54] METHOD AND APPARATUS FOR CONTROLLING TELEPHONE LINE ACCESS

[76] Inventor: Michael G. Kossor, 317 W. First Ave., Roselle, N.J. 07203

[21] Appl. No.: 718,565

[22] Filed: Apr. 1, 1985

[51] Int. Cl.$^4$ ............................................. H04M 1/66
[52] U.S. Cl. .................................. 379/200; 379/387; 379/61
[58] Field of Search ............... 179/2 EA, 90 D, 84 C, 179/18 DA; 379/200, 199, 387

[56] References Cited

U.S. PATENT DOCUMENTS

| | | | |
|---|---|---|---|
| 4,087,638 | 5/1978 | Hayes | 179/2 E |
| 4,099,033 | 7/1978 | Murray | 179/90 D |
| 4,179,588 | 12/1979 | Oliveira et al. | 179/90 K |
| 4,246,445 | 1/1981 | Hayasaka | 179/18 DA |
| 4,251,692 | 2/1981 | Waldman | 179/18 DA |
| 4,291,197 | 9/1981 | Yonaga | 179/2 EA |
| 4,358,640 | 11/1982 | Murray | 179/90 D |
| 4,436,957 | 3/1984 | Mazza | 179/2 EA |
| 4,467,140 | 8/1984 | Fathauer et al. | 179/2 EA |
| 4,482,787 | 11/1984 | Sagara et al. | 179/90 D |
| 4,511,765 | 4/1985 | Kuo | 179/18 DA |

Primary Examiner—James L. Dwyer
Attorney, Agent, or Firm—Martha G. Pugh

[57] ABSTRACT

A security device to protect a telephone line from unauthorized outgoing calls from a telephone unit, comprising either a conventional or cordless type receiver, which includes an access limiter and bypass circuit interposed between the base telephone and the telephone line which responds to an access enabling device to unblock the access limiter and bypass to outgoing calls. In one form, the access enabling device is an electronic circuit which responds to a multidigit dial signal to unblock the outgoing calls. In a simpler form, the access enabling device includes mechanically actuated device, such as a lock and key, to block and unblock outgoing calls.

9 Claims, 9 Drawing Figures

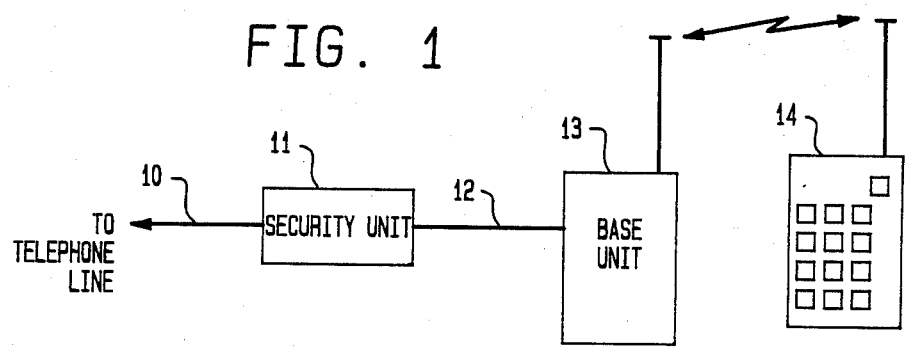
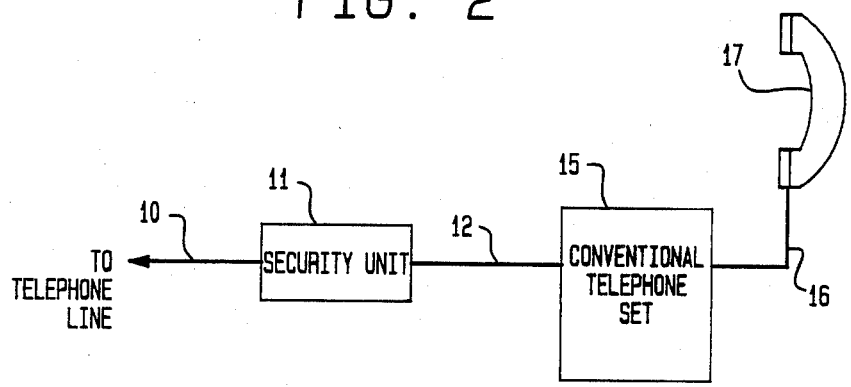
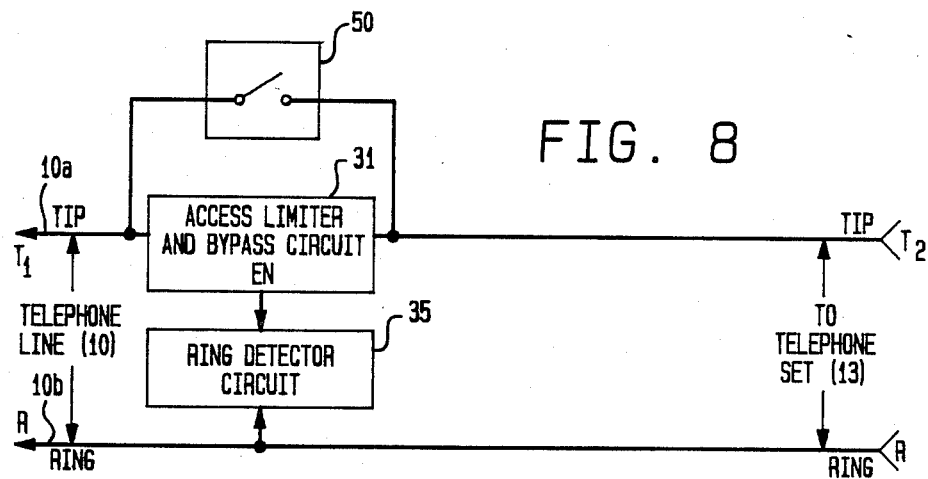

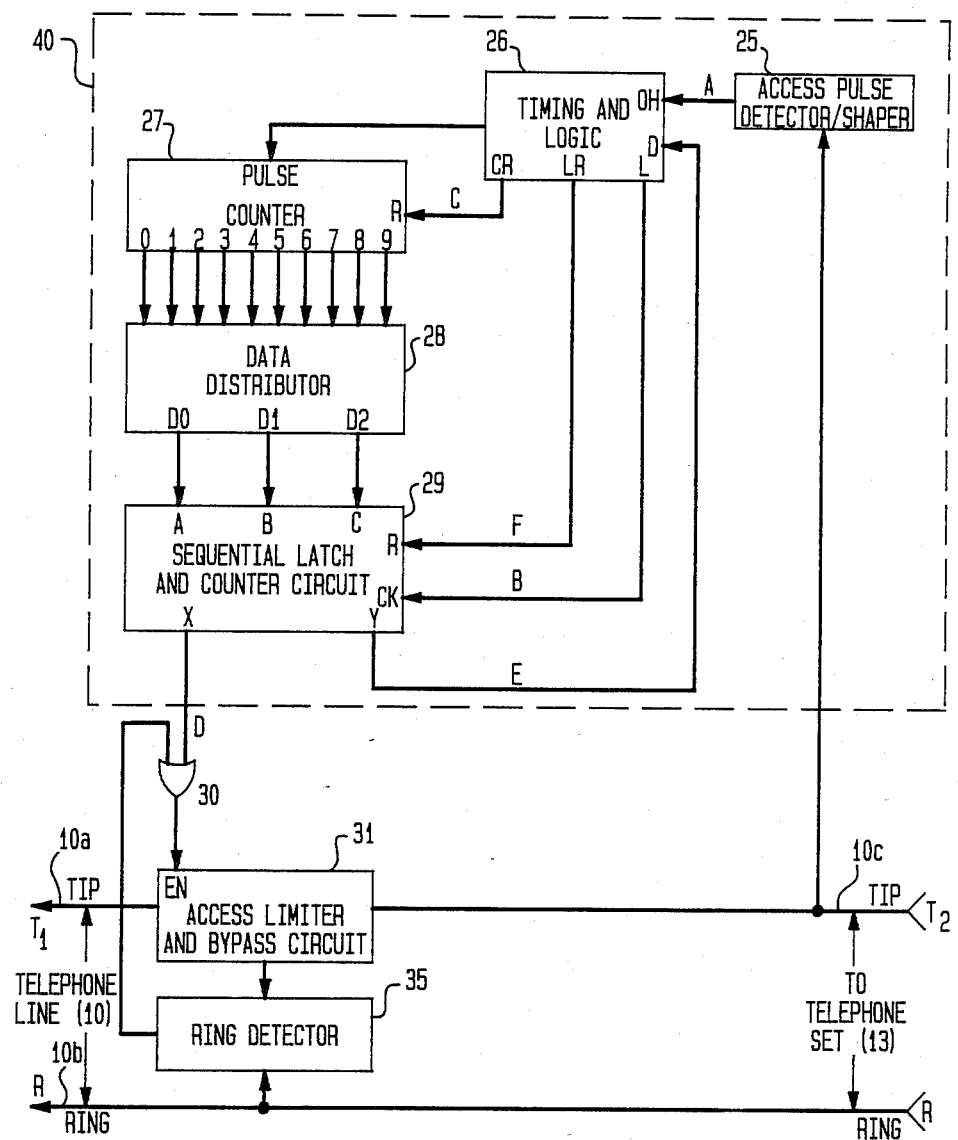

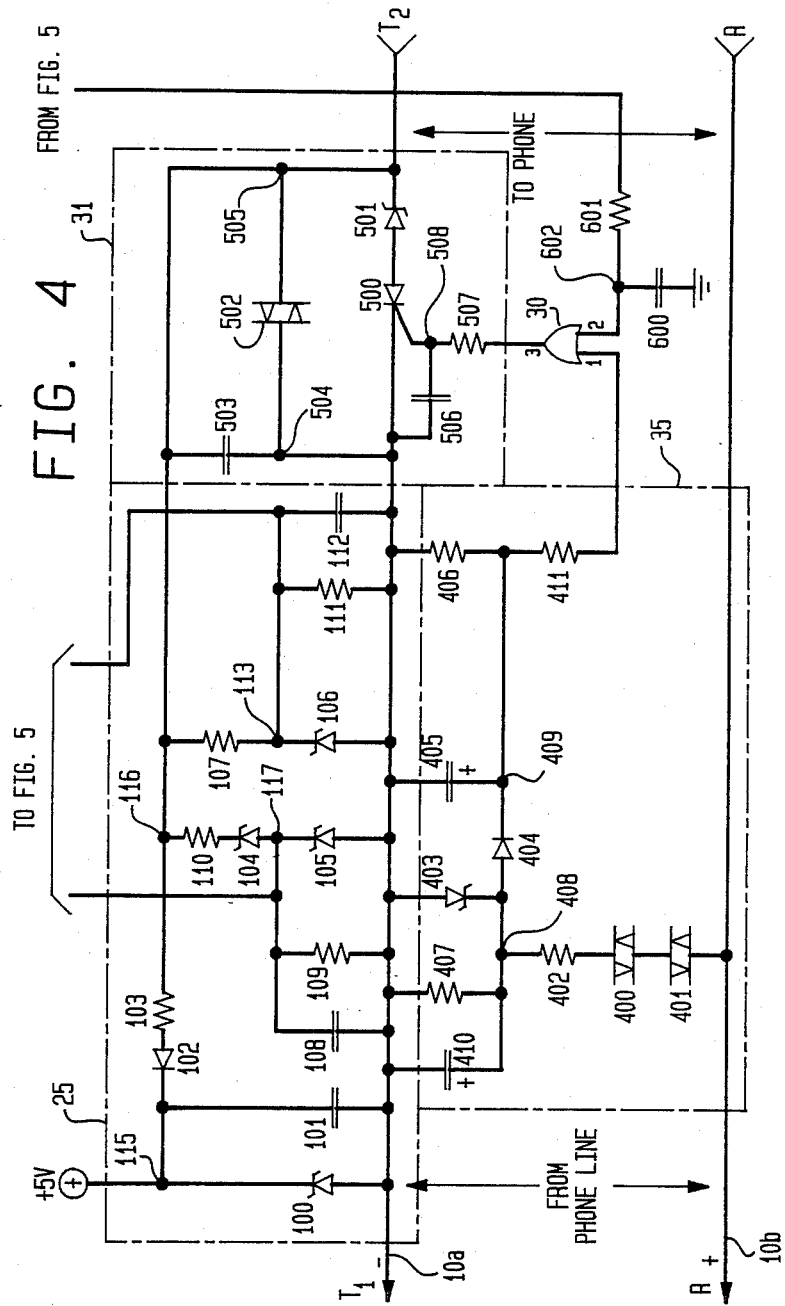

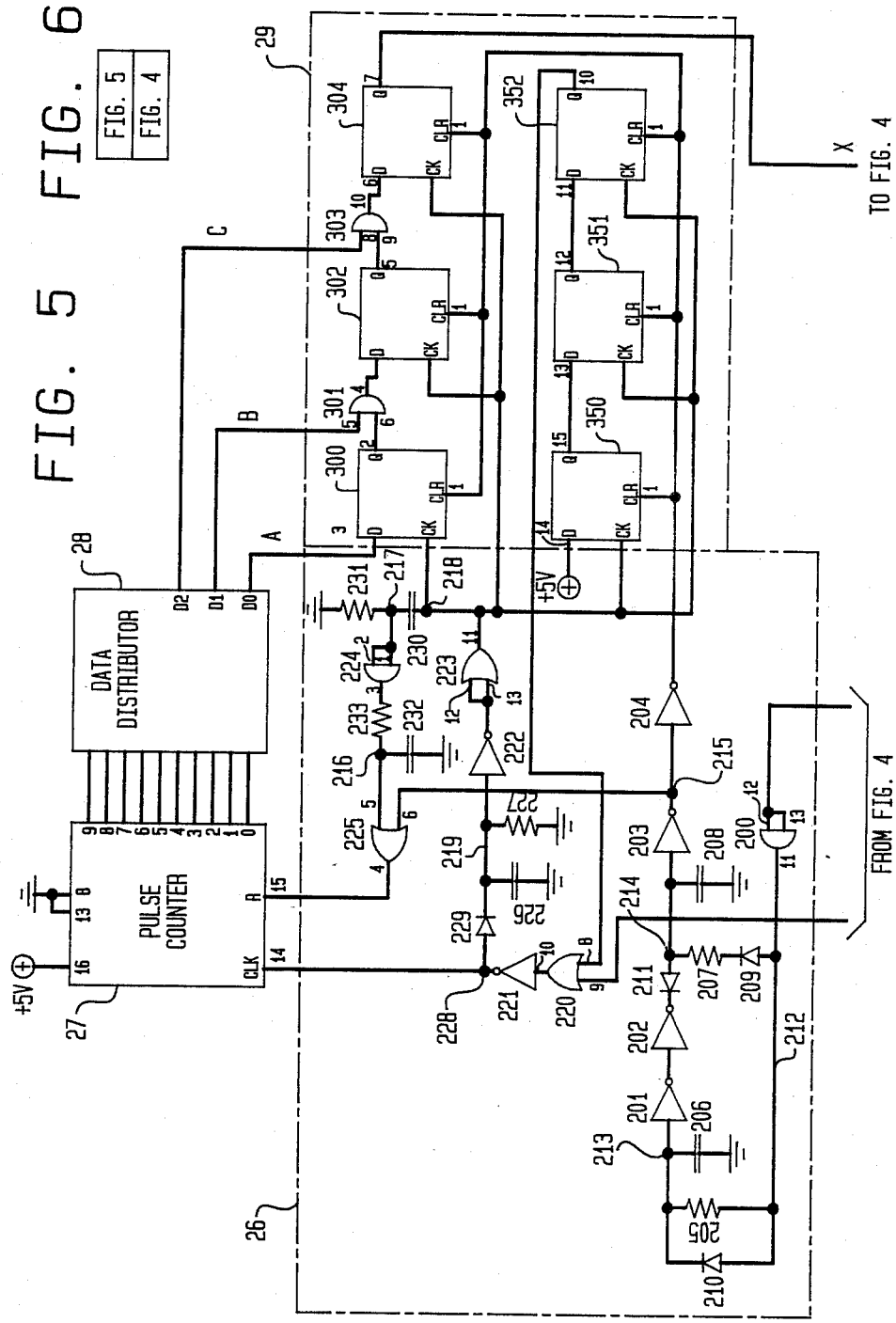

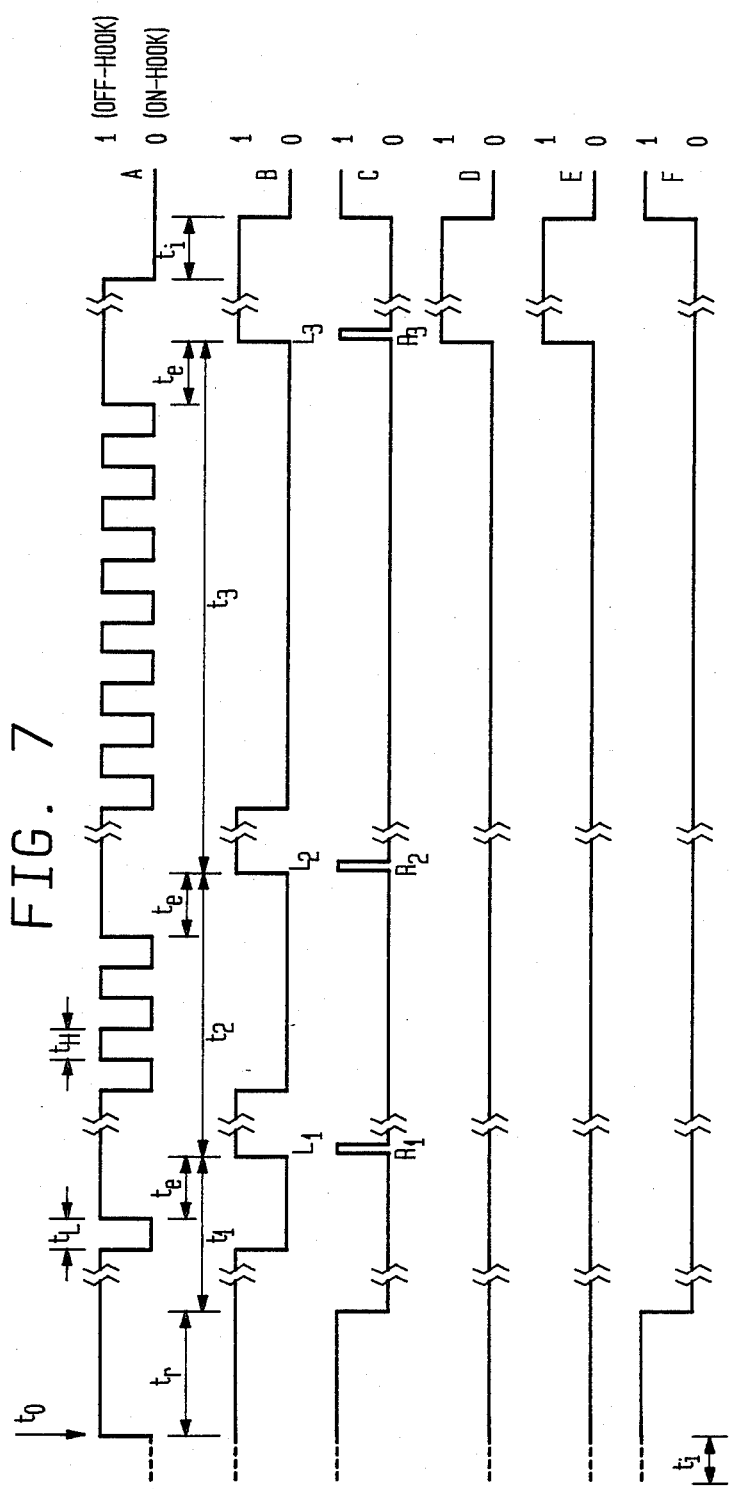

METHOD AND APPARATUS FOR CONTROLLING TELEPHONE LINE ACCESS

This relates in general to methods and apparatus for controlling telephone line access.

BACKGROUND OF THE INVENTION

In the past, telephone line access was controlled by mechanical means. For example, for conventional dial telephones, a mechanical lock was designed to prevent the dial from turning; and in the cases of the tone-type telephone, a lock was provided which prevents access to the buttons.

With the introduction of the modular telephone receiver actuated by electronic dial pulse dialing, the mechanical type dial locks became useless. The result is that in the case of a large number of telephone systems, the addition of security means is impossible using existing apparatus. In addition, there is an increasing number of cordless telephones which provide telephone line access via the air waves, and for which security presents a special problem. For such telephones, the system must be securable without subverting the entire purpose of cordless operation, which is to greatly reduce the necessity for being in physical contact with the base unit.

The principal object of the present invention is to provide an inexpensive, self-contained, line-powered modular means for providing security in an existing telephone system, regardless of the type of telephone unit being used with the system, whether it be dial pulse, tone-type or cordless.

In accordance with the present invention, a security circuit is interposed between the standard modular telephone line receptacle and the base telephone unit's line receptacle whether the latter is of the cordless type, or of the conventional wire-connected type. In either case, the interposed Security Unit of the present invention consists of three parts. These are an Access Limiter and Bypass Circuit, a Ring Detector Circuit, and a Mechanical or Electronically Actuated Enabling Device. The Access Limiter and Bypass Circuit, which is connected in series with the telephone line, allows the telephone to operate without signaling an off-hook condition. Since the telephone is thus enabled to operate, it functions to provide input to the Electronically Actuated Access Enabling Device, and may condition operation of the Mechanically Actuated Access Enabling Device.

A particular feature of a telephone system which includes one of the Security Units of the present invention is that it is receptive to incoming calls, even though the Access Enabling Device has closed the line to outgoing calls. Another feature is that it is line-powered, in that no batteries are needed.

The Ring Detector Circuit is connected to monitor the presence of an incoming telephone call. When the voltage across the telephone line increases above a preselected voltage $V_1$, which is 48 volts in the standard telephone line, a telephone call is detected. The Ring Detector Circuit becomes conducting, and allows the incoming signal to pass to the telephone. The Ring Detector Circuit is constructed to allow the enabling voltage to remain a short period, say five seconds, after the ringing stops. Thus, the incoming call can be answered any time during the ring cycle and for a short period thereafter. When the telephone line is in on-hook condition, the line voltage is below the voltage $V_1$ at which the Ring Detector Circuit becomes conducting. The entire device presents no load to the telephone line in the on-hook condition.

The Access Limiter and Bypass Circuit functions so that when the telephone is in off-hook condition, the telephone cannot draw sufficient current from the telephone line to signal an off-hook condition; thus the line is secure.

When the Access Enabling Device of the present invention is actuated, the line is opened between the telephone instrument and the telephone line for outgoing calls; otherwise, outgoing calls are blocked.

In a preferred embodiment of the present invention, developed especially for cordless type telephones, the Access Enabling Device takes the form of a Sequential Pulse-Actuated Electronic Circuit which, when it receives and identifies the proper sequence of pulses, sends a signal to bypass the Access Limiting Circuit, permitting access to the telephone line for outgoing calls. The Access Enabling Device, in a preferred example described in detail hereinafter, is responsive to a preselected sequence of pulses equivalent to, for example, three digits, to send a signal which causes the Access Limiter to be bypassed, thereby allowing outgoing calls access to the telephone line.

In a preferred form of the invention, the Access Enabling Device, which functions to receive and identify the preselected pulse sequence and to signal to bypass the Access Limiting Circuit, comprises five components in circuit combination.

These include the following:

An Access Pulse Detector and Shaper is connected to receive the pulsed signals generated by using the telephone set. A Timing and Logic Circuit is connected to receive the output from the Access Pulse Detector and Shaper and to control operation of a Pulse Counter and Sequential Latch and Counter Circuit. The Sequential Latch and Counter Circuit is programmed to detect a specific sequence of pulses by means of the Data Distributor Circuit. Upon detection of a specific sequence of pulses, the Sequential Latch and Counter Circuit will issue an enable signal that provides complete telephone line access for outgoing calls.

In a modified, simplified form of the invention, the Electronic Access Enabling Circuit is replaced by a key-actuated switch, which is mechanically actuated to open and close the line to outgoing calls.

SHORT DESCRIPTION OF THE DRAWINGS

FIGS. 1 and 2 are block diagrams illustrating how the Security Unit of the present invention is incorporated in series with the telephone line in the cordless and conventional telephone systems respectively.

FIG. 3 is a schematic showing, in block diagram, of the three main sections of the Security Unit of the present invention, namely, the Access Enabling Device including the Pulse Sequence Identifier enclosed in the broken line square, the Access Limiter and Bypass Circuit and the Ring Detector Circuit.

Figure 9:
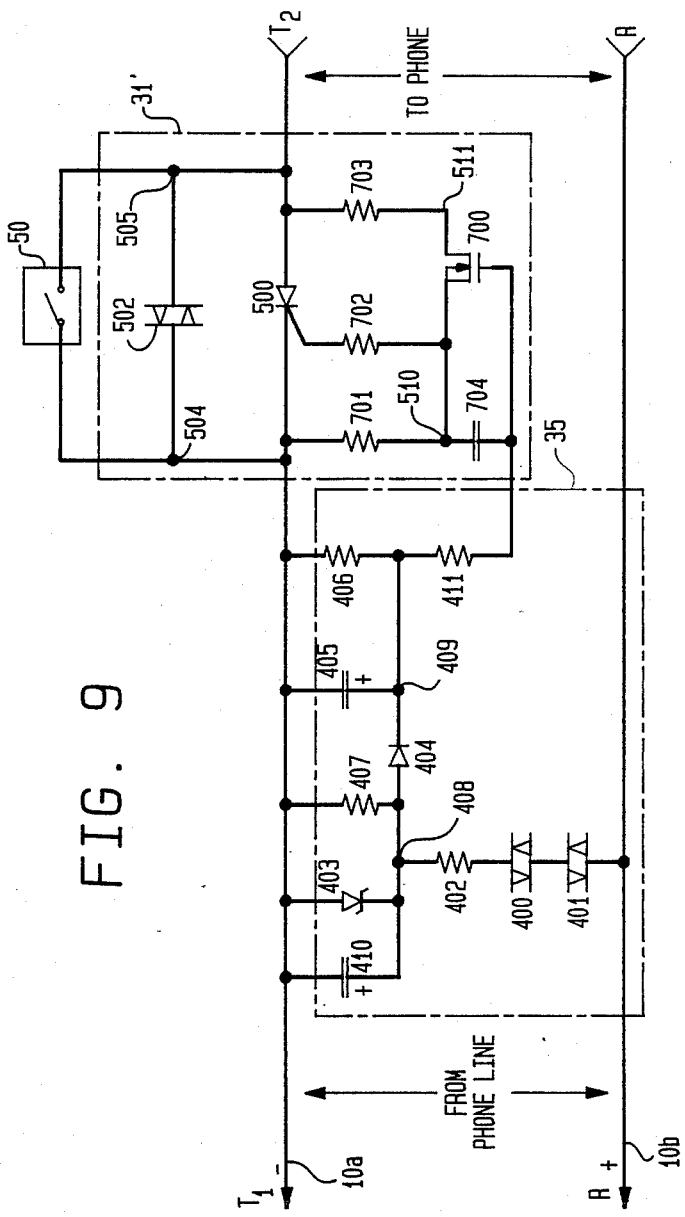

FIGS. 4 and 5, combined as shown in FIG. 6; provide the detailed circuit schematic of the circuit shown in block diagram in FIG. 3.

FIGS. 7A, B, C, D, E, and F are a plot of voltage against time at various points in the Security Unit of FIGS. 4 and 5 to assist in describing the circuit operation.

FIG. 8 is a schematic block diagram showing a modified form of the invention useful with telephone receivers other than the cordless type in which the Electronic Access Enabling Device is replaced by a key-operated switch.

FIG. 9 is a schematic representation of the modified version of the invention shown in FIG. 8.

DETAILED DESCRIPTION OF THE INVENTION

Referring to FIG. 1 which shows one embodiment of the invention, dialing information and voice communications are received from cordless hand set 14 at base station 13 by way of transmitted radio waves. Base station 13 is constructed to convert the information to a form standard to the telephone industry. The standard signals are then available at the telephone line jack of telephone base station 13 for the purpose of communicating with the telephone network, through the Security Unit 11 of the present invention which will be described in detail hereinafter.

Instead of the conventional coupling to the telephone network, in accordance with the present invention, the telephone line output of base station 13 is coupled to the Security Unit 11 by a standard modulator pitch cord 12. The Security Unit 11 is then connected to the telephone line 10 using another modular pitch cord.

In a simplified embodiment of the invention shown in FIG. 2 applied to a standard type of telephone unit, dialing information and voice communications are transmitted from hand set 17 to the conventional base set 15 by connecting wire 16. Standard telephone signals generated in the modular telephone unit 15 are then available at the telephone line jack of 15 for the purpose of communicating with the telephone network, through Security Unit 11, as in the previously described embodiment. It should be noted that dial information is sometimes entered directly at base set 15 when the circuitry of the latter is not contained in hand set 17.

Since base sets 13 and 15 conform to telephone industry standards, the output response generated by the system of FIG. 2 is identical to the system of FIG. 1 for the same input, provided sets 13 and 15 employ the same dialing method, i.e. dial pulse or tone-type. Thus, the response coupled to Security Unit 11 by way of 12 is identical in both cases for the same operation. In this way, Security Unit 11 of the present invention is independent of the type of telephone set used in the system, and is constructed to function normally with any telephone set which conforms to the industry standard. For the purposes of the present description it will be assumed that the base unit 13 of FIG. 1, and the telephone set 15 of FIG. 2 may take the form of any of the standard telephone sets available on the market.

FIG. 3 illustrates the three main components of the Security Unit of the present invention. These include an Access Limiter and Bypass Circuit 31, Ring Detector Circuit 35, and the Access Enabling Circuit 40.

In order to provide a secured telephone system, as indicated in FIG. 1, terminals $T_1$ and R (10a and 10b) are connected to the tip and ring wires of telephone line 10, respectively. Terminals $T_2$ and R (10c and 10b) are connected to the tip and ring wires of the telephone set 13 respectively. These connections are easily made using standard modular connectors between telephone line 10, Security Unit 11 and telephone set 13.

Referring to FIG. 3, there is shown schematically, in block diagram, a preferred embodiment of the invention. As indicated, 10a and 10b show connection to the standard telephone line (tip and ring wires). The Access Limiter and Bypass Circuit 31 is connected in series with the telephone line input terminal 10a, and the modular pitch cord 12, which is connected to the telephone set 13.

The Ring Detector Circuit 35 is connected to monitor the voltage across the telephone line, between terminals 10a and 10b.

Access enable signal from the Ring Detector Circuit 35 is connected to one input of OR gate 30. The line 10c to telephone set 13 is connected to the Electronic Access Enabling Device 40 which comprises the components enclosed in the dotted line, as shown in FIG. 3. The line from telephone set 13 is connected through Access Pulse Detector and Shaper 25 to initiate the operation of Timing and Logic Circuit 26, which is connected to initiate and control the operation of Pulse Counter 27 and Sequential Latch and Counter Circuit 29. Timing and Logic Circuit 26 is also connected to impose the incoming pulsed signals generated using the telephone set 13 on Sequential Latch and Counter Circuit 29. The "X" output of Sequential Latch and Counter Circuit 29 is connected to one input leg of OR gate 30, which is connected to control the bypass of Access Limiter and Bypass Circuit 31. The "Y" output from Sequential Latch and Counter Circuit 29 is connected to transmit a disabling signal to Timing and Logic Circuit 26 when the proper number of access sequence elements have been received.

Referring to FIG. 3, operation is as follows:

Access Limiter and Bypass Circuit 31 limits the amount of current drawn by telephone set 13 in the off-hook condition. This prevents telephone line 10 from registering the off-hook condition. Under these conditions, telephone set 13 cannot be used to initiate an outgoing telephone call; however, the on-hook/off-hook status of telephone set 13 is detected and monitored by Electronic Access Enabling Device 40. A specific sequence of on-hook/off hook transitions will cause Access Enabling Device 40 to issue an enable signal to 31 by way of OR gate 30. This enable signal provides complete telephone line access for initiating a telephone call. When the telephone call is complete, telephone set 13 is returned to its on-hook condition. This condition is detected by Access Enabling Device 40; and the enable signal is removed. The telephone system is then returned to its secured state.

Incoming telephone calls are detected by Ring Detector Circuit 35. An enable signal is generated and applied to Access Limiter and Bypass Circuit 31 via OR gate 30. Again, complete telephone access results, allowing the telephone call to be received in the normal way. Approximately four seconds after the ring signal stops, the telephone system returns to its secured state. The four second overlap is required to allow answering during the quiet period of the ring cycle.

Referring again to FIG. 3, it can be seen that Access Limiter Circuit 31 is connected in series with the telephone line 10a. When telephone set 13, connected to Security Unit 11, is placed in the off-hook condition, Access Limiter and Bypass Circuit 31 allows a small current to flow. The low current flow is insufficient to signal an off-hook condition to the telephone line; however, it produces a voltage drop across Access Limiter and Bypass Circuit 31 equal to approximately 45 volts. When the telephone set 13 is returned to its on-hook condition, no current flows through Access Limiter and Bypass Circuit 31; thus, the voltage across 31 falls to 0 volts.

Switching telephone set 13 between its on-hook/off-hook conditions will produce a sequence of voltage pulse series across Access Limiter and Bypass Circuit 31. The number of pulses produced will be equal to the number of on-hook/off-hook transitions made. The voltage pulses developed across circuit 31 are detected and conditioned by Access Pulse Detector and Shaper Circuit 25 to be of specific amplitude. A logic-one level results if the voltage across Access Limiter and Bypass Circuit 31 is above 30 volts; and a logic-zero results if the voltage falls below 30 volts. In this way, Access Pulse Detector and Shaper Circuit 25 produces a digital representation of the on-hook/off-hook transitions made by telephone set 13. (See FIG. 7A).

Producing an enable signal requires the digital representation of the on-hook/off-hook transitions generated by Access Pulse Detector and Shaper 25 to form a specified sequence.

The actuating pulse sequence consists of a first series of pulses, separated in time by a second series of pulses, separated in time by a third and final series of pulses, in the present example. It is contemplated in the present example that each series of pulses will not contain more than ten pulses. The series of pulses need not be periodic; however, the mark period of any pulse generated must be much less than the mark periods allowed to separate the first, second and third series of pulses from each other. Otherwise, there would be no way to distinguish three separate series of pulses. For the purposes of the present discussion, the time $t_e$ will be defined as the minimum time interval mark, which separates the three series of pulses, the period of any pulse generated which is much less than the time interval $t_e$ seconds, thereby functioning to separate one series of pulses from another. The time relationship between the mark intervals is similar to that of letters and word spacing of morse code.

To aid in describing the operation of Electronic Access Enabling Circuit 40, reference will be made to wave forms shown in FIG. 7 of the drawings. FIG. 7A illustrates the output produced by Access Pulse Detector and Shaper Circuit 25, for a typical access sequence generated by on-hook/off-hook transitions of telephone set 13.

It is assumed telephone set 13 has been in the on-hook condition for time $t_i$. At time $t_0$, telephone set 13 is placed in the off-hook condition. Access Pulse Detector and Shaper Circuit 25 detects the off-hook condition and causes Timing and Logic Circuit 26 to issue reset signals to Pulse Counter Circuit 27 and Sequential Latch and Counter Circuit 29. The reset period lasts for time $t_r$. (See FIGS. 7C and 7F). Time interval $t_1$ begins, immediately following reset period $t_r$. During time interval $t_1$, Timing and Logic Circuit 26 allows Pulse Counter Circuit 27 to count all pulses detected by Access Pulse Detector and Shaper 25, provided each pulse has a period less than $t_e$ seconds. Interval $t_1$ ends when Timing and Logic Circuit 26 detects the output of Access Pulse Detector and Shaper Circuit 25, remaining at a logic-one level for $t_e$ seconds. Referring to FIG. 7A, one can see that since time interval $t_1$ began, only one pulse is detected before time lapse $t_e$ occurred. Thus, Pulse Counter Circuit 27 counts a single pulse during interval $t_1$. This results in the decimal-one output of Pulse Counter Circuit 27 to be driven to a logic-one state. The output is connected to the A input of Sequential Latch and Counter Circuit 29 by Data Distributor Circuit 28.

Upon the completion of time interval $t_1$, Timing and Logic Circuit 26 produces latch pulse $L_2$, (See FIG. 7B). This causes Sequential Latch and Counter Circuit 29 to latch the data on its A input. Timing and Logic Circuit 26 then issues reset pulse R1. (See FIG. 7C). This resets Pulse Counter Circuit 27. This action completes the process for the first series of pulses in the access sequence.

Time interval $t_2$ now begins. Referring to FIG. 7A, one can see that during time interval $t_2$ three pulses are detected by Access Pulse Detector and Shaper 25 before time lapse $t_e$ occurs. Thus, Pulse Counter Circuit 27 counts three pulses during time interval $t_2$, resulting in the decimal-three output of Pulse Counter Circuit 27 to be driven to logic-one state. This output is connected to the B input of Sequential Latch and Counter Circuit 29 by means of Data Distributor Circuit 28. Upon the completion of time interval $t_2$, Timing and Logic Circuit produces latch pulse $L_2$, (See FIG. 7B). This causes Sequential Latch and Counter Circuit 29 to latch the data on its B input. Timing and Logic Circuit 26 then issues reset pulse $R_2$. (See FIG. 7C). This resets Pulse Counter Circuit 27.

Time interval $t_3$ subsequently begins. During time interval $t_3$, seven pulses are detected by Access Pulse Detector and Shaper Circuit 25 before time lapse $t_e$ occurs. (See FIG. 7A). Thus, Pulse Counter Circuit 27 counts seven pulses during time interval $t_3$. This results in the decimal-seven output of Pulse Counter Circuit 27 to be driven to logic-one state. This output of Pulse Counter Circuit 27 is connected to the C input of Sequential Latch and Counter Circuit 29 by means of Data Distributor Circuit 28. Upon completion of time interval $t_3$, Timing and Logic Circuit 26 produces latch pulse $L_3$. (See FIG. 7A). This causes Sequential Latch and Counter Circuit 29 to latch the data on its C input. The preceding events result in Sequential Latch and Counter Circuit 29 generating an enable signal to Access Limiter and Bypass Circuit 31 via OR gate 30.

In addition to identifying a specific access pulse sequence, Sequential Latch and Counter Circuit 29 counts each series of pulses, or sequence elements, detected by Access Pulse Detector and Shaper 25. This is done by incrementing the counter in 29 each time $t_e$ passes with the output of Access Pulse Detector and Shaper 25, remaining at logic-one state.

In the presently described example, once three series elements are detected and processed, Sequential Latch and Counter Circuit 29 issues a disable signal to Timing and Logic Circuit 26 preventing it from accepting further input. This is shown in FIG. 7E. As a result of this, the access sequence must be entered correctly the first time. This operation eliminates trial and error attempts to gain access to the telephone line 10.

If an error in entering the access sequence occurs, Timing and Logic Circuit 26 will issue a power-up reset, upon detection of an on-hook condition for a time interval of $t_i$ seconds.

The access sequence indicated in FIG. 7A consists of one pulse followed in time by three pulses, followed in time by seven pulses or the pulse series sequence equivalent to the digits 1-3-7. In the present example, the wiring of Data Distributor Circuit 28 is so configured that a single pulse in the first series of the access pulses sequence imposes a logic-one level on the A input of Sequential Latch and Counter Circuit 29 following time interval $t_1$; three pulses in the second series of access pulses impose a logic-one level on the B input of Sequential Latch and Counter Circuit 29 following the time interval $t_2$; and seven pulses in the third series impose a logic-one level on the C input of Sequential Latch and Counter Circuit 29 following the time interval $t_3$.

Thus, when the received pulse series sequence conforms to the wiring pattern of Data Distributor Circuit 28, Sequential Latch and Counter Circuit 29 must latch a logic-one level on its A input at the end of time interval $t_1$, thereby enabling its B input; a logic-one level must be present at the B input at the end of time interval $t_2$ thereby enabling the C input; and a logic-one level must be present on the C input at the end of time interval $t_3$, thereby generating the enable signal.

Changing the access sequence requires reconfiguring Data Distributor Circuit 28. For example, to generate an enable signal with sequence of pulse series 5-2-10, Data Distributor Circuit 28 must connect decimal outputs 5-2-0 to the A, B and C inputs of Sequential Latch and Counter Circuit 29, respectively. Note that ten pulses cause the decimal-zero output of Pulse Counter 27 to be driven to logic-one level. Otherwise, the number of pulses counted will cause the corresponding decimal output of Pulse Counter 27 to be driven to a logic-one state. Note that for each of the 1000 possible wiring configurations of Data Distributor Circuit 28 there is only 1 access pulse series sequence which will cause Sequential Latch and Counter Circuit 29 to issue an enable signal.

For the illustrative embodiment described, the principals of operation are independent of the type of telephone set 13, being used in the system. The only requirement of telephone 13 is the capability of generating a pulse series sequence by toggling between on-hook and off-hook conditions. By making time intervals $t_e$ and $t_r$ long, five and ten seconds respectively, one could easily generate an access sequence similar to that indicated in FIG. 7A by manually toggling the telephone set hook switch between on-hook and off-hook conditions. This procedure would prove successful for all types of telephone.

When the telephone set 13, used in the system is of the conventional dial pulse type (Mechanical or Electronic), generation of the access sequence becomes simplified. The small current passed by Access Limiter and Bypass Circuit 31 allows most electronic dial pulse type telephone sets to function. Dialing under the present conditions cannot be used to pulse telephone line 10; however, digits dialed produce an effect equivalent to toggling between on-hook and off-hook conditions. The digit dialed corresponds directly to the number of on-hook/off-hook transitions made with the exception of digit zero which produces ten transitions. The pattern in which the pulses are generated by the telephone set must conform to the telephone industry standards. For this reason, a fixed value for time intervals $t_e$ and $t_r$ can be obtained.

To produce the access sequence illustrated in FIG. 7A, using a dial pulse type telephone set 13, one simply dials digits 1-3-7 in the normal way.

The system described will secure any type of telephone set. The telephone line access procedure is simplified when the telephone set employs dial pulse dialing. One key feature of this system is that the access procedure can be performed using the normal operating techniques of the telephone set used in the system. This feature allows cordless telephone systems employing no OR Manual Security Lockout to be secured without impeding the purpose of cordless telephones. This is because the access sequence can be entered by means of the cordless hand set 14, from any location in range of the base station 13. There is no need to travel to the base unit 13 to control security.

FIGS. 4 and 5 (combined as indicated in FIG. 6) show the detailed wiring schematic of the circuit shown in FIG. 3, the circuit components shown in block in the latter figure being enclosed in dotted line enclosures bearing the same numbers. FIG. 6 shows how FIGS. 4 and 5 are combined.

Referring to FIG. 4 access Pulse Detector and Shaper Circuit 25 is connected in series with telephone input line 10a, and contains Zener diode 100 and 50 micro-farad, 16-volt capacitor 101 connected in parallel to provide a 5-volt positive power source to junction 115. The latter is connected to the cathode of diode 102, the anode of which is connected in series with 10K ohm resistor 103 to junction 116, which is connected through the 27K ohm resistor 110 in series with the cathode of 25-volt Zener diode 104 to junction 117. The latter is connected to telephone input line 10a through a parallel circuit consisting of the 0.01 micro-farad capacitor 108, the 100K ohm resistor 109, and the cathode of 5-volt Zener diode 105. Junction 116 is connected through the 27K ohm resistor 107 to junction 113, which is connected to telephone input line 10a through a parallel circuit consisting of the cathode of 5-volt Zener diode 106, the 100K ohm resistor 111 and the 0.01 micro-farad capacitor 112. Referring to FIG. 5, junction 113 is connected to two input legs, 12 and 13 of the AND gate 200, in the Timing and Logic Circuit 26, which will be described hereinafter.

Junction 116 is connected from Access Pulse Detector and Shaper Circuit 25 to one terminal of the 0.01 micro-farad capacitor 503, and one terminal 505 of diac 502, which is connected between 505 and 504. Diac 502, in the present example, is a 63-volt diac, Sylvania Model #6412. In parallel with diac 502 between terminals 504 and 505, is connected a silicon-controlled rectifier 500, whose anode is connected to the anode of the 6-volt Zener diode 501, connected to terminal 505, the cathode of 500 being connected to terminal 504. The silicon-controlled rectifier in preferred form, is Sylvania Model #ECG-5404. The gate of SCR 500 is connected to one terminal 508 of the 22K ohm resistor 507, the other terminal of which is connected to the output terminal 3 of OR gate 30. The 0.01 micro-farad capacitor 506 is connected between the cathode of SCR 500 and terminal 508, to the gate.

Input leg #2 of the OR gate 30 is connected through junction 602 and one megohm resistor 601 to receive the output from the "X" terminal of Sequential Latch and Counter Circuit 29, as will be described. (See FIG. 5). Junction 602 is connected to ground through the 0.1 micro-farad capacitor 600.

Let us refer now to Ring Detector Circuit 35. Two pairs of 63-volt diacs, type ECG-6412 designated 400 and 401, each pair connected back-to-back, are in series with the 33K ohm resistor 402 between the telephone line 10b and junction 408. The latter is connected to telephone line 10a through a three branch parallel circuit which includes the 10 micro-farad 16-volt capacitor 410, the 100K ohm resistor 407, and the anode of the 5-volt Zener diode 403. Junction 408 is connected to anode of diode 404 whose cathode is connected to junction 409. The latter is connected to telephone input line 10a through a two-branch parallel circuit comprising the 4.7 micro-farad, 16-volt capacitor 405 and the two megohm resistor 406. Junction 409 is connected to the #1 leg of OR gate 30 through the one megohm resistor 411.

Junction 113 in the Access Limiter and Bypass Circuit 25 is connected to the input legs 12 and 13 of AND circuit 200, whose output leg is connected to junction 212. (See FIG. 5). The latter is connected through a parallel circuit including the anode of diode 210 and the 1.5 megohm resistor 205 to junction 213, which is connected to ground through the 0.1 micro-farad capacitor 206. Junction 213 is connected through a pair of series-connected invertors 201 and 202 in series with the cathode of diode 211 whose anode is connected to junction 214. The latter is connected through the one megohm resistor 207 in series with diode 209, whose anode is connected to junction 212 at the output of leg 11 of AND circuit 200. Junction 214, which is connected to ground through the 0.22 micro-farad capacitor 208, is connected through invertor 203 to junction 215, which is connected through invertor 204 to Sequential Latch and Counter Circuit 29, as will be described later.

Junction 215 is connected through input leg #6 of OR gate 225, whose input leg #5 is connected to junction 216. The output contact 4 of OR gate 225 is connected to the reset pin 15 of the Pulse Counter Circuit 27, whose pin 14 is connected to junction 228 at the output of invertor 221. Junction 228 is connected through the anode of diode 229 to junction 219, which is grounded through 0.1 micro-farad capacitor 226 in parallel with the two megohm resistor 227. Junction 219 is connected through invertor 222 to the input legs 12 and 13 of OR gate 223, whose output leg 11 is connected to junction 218, leading to the CK input of Sequential Latch and Counter Circuit 29. Junction 218 is connected through the 0.022 microfarad capacitor 230 to junction 217. The latter, which is grounded through the one megohm resistor 231, is connected to legs 1 and 2 of AND gate 224, whose leg #3 is connected through the one megohm resistor 233 to the junction 216 at input leg #5 of OR gate 225.

Referring again to FIG. 4, juntion 117 from Access Limiter and Bypass Circuit 31 is connected to the #9 input leg of OR gate 220, whose output leg #10 is connected through invertor 221 to junction 228. (FIG. 5). The other input leg #8 of OR gate 220 is connected to receive the "Y" output from the Sequential Latch and Counter Circuit 29, pin 10.

The Pulse Counter Circuit 27 is of a type well-known in the art, such as, for example, Model #CD 4017BE manufactured by RCA Corporation, identified as their part #CD 4017BE. The latter functions to count pulses from invertor 221, thereby to cause one of its ten outputs, labeled 0-9, to go high. The output which goes high is directly related to the number of pulses counted, except the number zero, which requires 10 pulses to go high. Pulse Counter Circuit 27 has sixteen connecting pins, pins 14 and 15 being connected as previously indicated, pin 16 being connected to a 5-volt DC source, pins 13 and 8 being grounded, and pins 0-9 being connected in order to correspond to pins 0-9 of Data Distributor Circuit 28.

Data Distributor 28 functions mechanically to direct three outputs of Pulse Counter Circuit 27 to the three inputs of Sequential Latch and Counter Circuit 29. Data Distributor Circuit 28 functions as a means for readily changing the data distribution between circuits 27 and 29.

The Data Distributor Circuit 28 used in the present embodiment can take the form, for example, of a modular connector consisting of 13 pins in which three of these pins, DØ, D1, and D2 could be connected to any of the remaining pins Ø through 9. In the alternative, it will be understood, by a person skilled in the art, that Data Distributor Circuit 28 can take many different forms, such as, for example, rotary or dip switches.

The three output terminals of the Data Distributor Circuit 28, which will be designated DØ, D1, and D2 are connected to the A, B and C input terminals of the Sequential Latch and Counter Circuit 29.

The Sequential Latch and Counter Circuit 29, comprises substantially identical six D-type latches 300, 302, 304, 350, 351 and 352, which in the preferred example under description, are all part of a single integrated circuit, which may take the form of Model #CD 40174BE, manufactured by RCA Corporation.

The output from invertor 204, whose input terminal is connected to junction 215, is connected to the #1 pin of latches 300, 302, 304, 350, 351 and 352. Junction 218 from the output of OR gate 223 is connected to the CK pin of each of the latches 300, 302, 304, 350, 351 and 352, to provide the latch clock pulse to the Sequential Latch and Counter Circuit 29. The DØ lead from Data Distributor Circuit 28 is connected to the A input, #3 pin, of latch 300, whose pin #2 is connected to input leg #6 of AND gate 301. The D1 lead from Data Distributor Circuit 28 is connected to the #5 input leg of AND gate 301. The output leg #4 of AND gate 301 is connected to the #4 pin of latch 302, whose #5 pin is connected to the #9 input leg of AND gate 303. The D2 lead from Data Distributor Circuit 28 is connected to the #8 input leg of AND gate 303, whose output leg #10 is connected to pin #6 of latch 304. The #7 pin of the latter is connected through the one megohm resistor 601 and junction 602 to the #2 input leg of the OR circuit 30. (See FIG. 4).

The #14 pin of latch 350 is connected to 5-volts positive, D.C., whereas its pin #15 is connected to pin #13 of latch 351. Pin #12 of the latter is connected to pin #11 of latch 352, whose pin #10 is connected to the input leg #8 of OR gate 220.

All AND gates are in the same integrated circuit and are interchangeable. The same is true for all OR gates; and invertors 300, 302, 304, 350, 351 and 352 are all contained in the same integrated circuit. Signals CK and CLR are internally connected together on the integrated circuit.

It should be stated that *all* logic elements (AND gates, OR gates, invertors, Pulse Counter Circuit 27 and Sequential Latch and Counter Circuit 29) could be fabricated on the same integrated circuit. Discrete devices were used in the example. Also, other configurations could be used to produce the same operation, resulting in the production of control signals as illustrated in FIGS. 7A-F.

Operation of Circuit of FIGS. 4, 5 and 6

Let us refer to the complete schematic diagram of the Security Lock of the present invention shown in FIGS. 4 and 5, combined as FIG. 6. Each fundamental block described in FIG. 3 has been identified in the diagram using dashed lines. The operation of each functional block will be described in detail. Proper installation of the circuit requires that terminals 10a and 10b are connected to the tip and ring wires of the telephone line 10 and terminals 10c and 10b are connected to the tip and ring wires of the telephone set 13, respectively.

When telephone set 13 is in the on-hook condition, no current is drawn from the telephone line 10. When telephone 13 is placed in the off-hook condition, a small current is allowed to pass through Access Pulse Detector and Shaper Circuit 25. After entering Circuit 25, the current is split three ways. A first current path is through diode 106. A logic-one level is generated across 106 any time telephone set 13 is in the off-hook condition. A logic-zero results when telephone set 13 is placed in the on-hook condition. This is how Access Pulse Detector and Shaper Circuit 25 detects an off-hook condition.

The second current path is through diodes 104 and 105. A logic-one level is generated across 105 provided the voltage across Access Pulse Detector and Shaper Circuit 25 exceeds 30 volts. For standard 48-volts telephone systems, an off-hook condition of 13 will provide a 45-volt potential across 25. When access pulses are generated, the voltage across Access Pulse Detector and Shaper 25 falls far below 30 volts for the duration of each pulse; hence, the logic level seen across diode 105 detects the access pulses.

The third and final current path through Access Pulse Detector and Shaper Circuit 25 is through diode 100. This is the largest of the three current paths. The voltage produced across diode 100 and capacitor 101 is used to supply power to all logic functions in the Security Unit of the present invention. Diode 102 prevents discharge of capacitor 101 back through the charge source. Resistors 103, 110 and 107 determine the magnitude of the current allowed to pass through Access Pulse Detector and Shaper Circuit 25 under off-hook conditions of telephone base set 13. The current magnitude is limited to a value of less than 6 milliamperes. This is to prevent telephone line 10 from registering an off-hook condition and applying a dial tone to the line. The other components are used for wave shaping and noise supression.

The Timing and Logic Circuit 26 uses the signals detected by Access Pulse Detector and Shaper Circuit 25 to initiate and control the operation of Electronic Access Enabling Device 40. The reset circuit consists of elements 200 through 211. The logic signal generated by Access Pulse Detector and Shaper Circuit 25 indicating the on-hook/off-hook status of telephone set 13 serves as input to the reset circuit. When an off-hook condition is detected by Access Pulse Detector and Shaper Circuit 25, a reset signal is generated. The output of AND gate 200 goes high. The input of invertor 203 is delayed from going high by the time delay of R-C Circuit 207 and 208. This results in invertors 203 and 204 generating reset signals to the Counter Circuits 27 and 29 during power-up. The reset period, $t_r$, is determined by resistor 207 and capacitor 208. When the telephone set 13 is returned to the on-hook condition for a time period of $t_f$ seconds, another reset signal must be issued. The output of AND gate 200 goes low. The time constant of R-C Circuit 205 and 206 delays the effect of AND gate 200 going low, thereby causing invertors 201 and 202 from changing state. However, after a fixed time interval, given as $t_i$, invertor 202 goes low, discharging capacitor 208 through diode 211, merely causing invertor 203 and 204 to issue reset signals to Counter Circuits 27 and 29. The delay during power-up serves to allow the power source contained in Access Pulse Detector and Shaper Circuit 25 to charge and stabilize while maintaining the reset signals. The delay during power-down is required to prevent the reset circuit from falsely being engaged by telephone company switching equipment when a telephone call is placed.

Timing and Logic Circuit 26 is responsible for controlling the operation of Pulse Counter Circuit 27, Sequential Latch and Counter Circuit 29 and for establishing the timer interval $t_e$. Once the access sequence begins, OR gate 220 and invertor 221 allow the pulses to pass to Pulse Counter Circuit 27. The pulses are also used to charge capacitor 226, causing the output of OR gate 223, the latch clock for 29, to go low. When the access pulses stop, capacitor 226 discharges through resistor 227. The time required to cause OR gate 223 to change back to a logic-one has been defined as time interval $t_e$. Thus, the time constant of the R-C Circuit 226 and 227 determines the distinction between access pulses and pulse sequence series.

Once the latch clock is driven high, by the output of OR gate 223, a pulse counter reset signal must be generated. This is accomplished by causing the output of AND circuit 224 to go high on the leading edge of the latch clock signal. The time constant of the R-C Circuit 233 and 232 delays the reset pulse from reaching Pulse Counter Circuit 27 until the data has had a chance to be latched by Sequential Latch and Counter Circuit 29. OR gate 225 allows Counter 27 to be reset from the outputs of invertor 203 or AND circuit 224.

Pulse Counter Circuit 27 functions to count pulses from invertor 221, thereby to cause one of the former's ten outputs to go high, corresponding to the number of received pulses.

Data Distributor 28 serves to direct three outputs of Counter 27 to the three inputs of Sequential Latch and Counter Circuit 29 in a preselected manner.

The Sequential Latch and Counter Circuit of 29 operates to generate an enable signal to open the telephone line 10 for normal outgoing calls. The circuit consists of elements 300 through 304. Upon power-up, after a reset signal has been received, the outputs of 300, 302 and 304 are all logic-zero. Data on the B or C inputs from Data Distributor Circuit 28 cannot reach latches 302 or 304 since one input to AND circuits 301 and 303 are at logic-zero. Only the A input is currently active as input to 29. The A input must be high, prior to occurence of the latch clock pulse, so that after occurence of the latch clock pulse the output of 300 will be at a logic-one level. This will cause data on the B input of Sequential Latch and Counter Circuit 29 to pass through AND circuit 301 and arrive at the D input of latch 302. A logic-one level is required on the B input of Sequential Latch and Counter Circuit 29 prior to the receipt of the next latch clock pulse, so that after the latch clock pulse the output of latch 302 will be at a logic-one level. Under these conditions AND gate 303 is enabled to pass data from the C input of Sequential Latch and Counter Circuit 29 to the D input of latch 304. A logic-one level is required on the C input of Sequential Latch and Counter Circuit 29 prior to the next latch clock pulse, so that after the latch clock pulse the output of latch 304 goes high and generates an enable signal, opening the telephone line.

The number of access sequence elements which are required to issue an enable signal is presently three; however, this figure could be increased or decreased by adding or subtracting the number of stages contained in Sequential Latch and Counter Circuit 29. To increase the number of access elements to four, requires, for example, the addition of one more stage. Thus, Data Distributor Circuit 28 must provide four inputs to Sequential Latch and Counter Circuit 29; and the Counter Circuit becomes a four-bit shift register rather than a three-bit shift register. This should be apparent to someone skilled in the art.

In summary, to produce an enable signal requires a logic-one on the A input lead of 29 prior to the first latch clock pulse, a one on the B input prior to the second latch clock pulse and a one on the C input prior to the third latch clock pulse. This is the only sequence in which three latch pulses will produce an enable signal. To insure no more than three latch pulses are generated, Sequential Latch and Counter Circuit 29 provides a second function which comprises a Counter Circuit in the form of a three-bit shift register, latches 350, 351, 352, which produce a disable signal to OR gate 220 upon completion of three clock pulses. The output of 220 remains high preventing any further operation of Sequential Latch and Counter Circuit 29.

The operation of both Pulse Counter Circuit 27 and Sequential Latch and Counter Circuit 29 are controlled by timing signals derived from the access pulse sequence itself. Thus, the process of counting access pulses and latching the result is synchronized for any access pulse sequence. Data Distributor Circuit 28 defines which outputs of Pulse Counter Circuit 27 are assigned to the A, B and C inputs of Sequential Latch and Counter Circuit 29. The access pulse sequence can be determined by knowing which decimal outputs of Pulse Counter Circuit 27 have been assigned to the A, B and C inputs of Sequential Latch and Counter Circuit 29 as was described previously.

Ring Detector Circuit 35 produces an enable signal for complete telephone line access upon receipt of a ring signal. The ring signal is approximately 100 volts RMS. This causes diacs 400 and 401 to break down and conduct. Five volts are developed across Zener diode 403. This voltage charges capacitor 405 through resistor 407. The voltage across capacitor 405 serves as an enable signal to Access Limiter Circuit 31 by way or OR gate 30. Capacitor 405 will remain charged for approximately five seconds, thus allowing telephone set 13 to be answered during the quiet intervals between the ring cycle. Once the ring signal ceases, resistor 407 discharges capacitor 405. The other elements in Ring Detector Circuit 35 are for signal conditioning. Diode 404 prevents discharge of capacitor 405 through the charge source.

Access Limiter and Bypass Circuit 31 prevents a DC path from being completed unless an enable signal is received from Sequential Latch and Counter Circuit 29 or Ring Detector Circuit 35 via OR circuit 30, at which time SCR 500 will complete the DC path and an off-hook condition is signaled to telephone line 10. Diode 501 is necessary to maintain a power source to Access Pulse Detector and Shaper 25 when SCR 500 is conducting. Diac 502 allows the ring signal to pass unobstructed. Since SCR 500 only conducts in one direction it would obstruct the AC ring signal. The other components are for noise supression. It should be noted that an NPN transistor could be used in place of SCR 500. In the latter case, diode 501 may be omitted.

Referring to FIG. 8, there is shown a modification of the invention, in which the Electronic Access Enabling Device shown in the block diagram included within the dotted lines is replaced by a key switch as shown in FIG. 8.

If the telephone set is other than the cordless type, Electronic Access Enabling Device Circuit 40, may be completely replaced by a key switch as shown in 50. The ability to receive incoming calls has not changed. However, to achieve telephone line access, key switch 50 must be closed. This is performed by authorized users having a unique key.

The Ring Detector Circuit 35 and Access Limiter and Bypass Circuit 31 could be structured substantially as previously described with reference to FIGS. 3 and 4. However, the circuit could be even more simplified if OR gate 30 in the latter circuits is replaced by a single field effect transistor as shown in FIG. 9. In this latter case, circuit components and operation of the Ring Detector Circuit 35 are substantially as described previously with reference to FIG. 4 except that 403 is a Zener diode, 25 volts, capacitor 410 has a value of 0.1 micro-farads, and resistor 406 has a value of 680K ohms.

In the modified Access Limiter and Bypass Circuit 31 of FIG. 9, the key operated switch 50 is connected across junctions 504 and 505, across diac 502, in parallel with silicon-controlled rectifier 500, both of which elements are substantially as described with reference to FIG. 4. In the modified version shown in FIG. 9, the cathode of the silicon-controlled rectifier 500 is connected through the 1K ohm resistor 701 to junction 510, to which the gate electrode is connected through the 4.7K ohm resistor 702. The anode of the silicon-controlled rectifier 500 is connected through the 22K ohm resistor 703 to junction 511. The source and drain of field effect transistor are connected between junctions 510 and 511, respectively. A 0.001 micro-farad capacitor 704 is connected between the source and gate of field effect transistor 700. The latter may take the form, for example, of a part designated as No. IRFD 1Z3, sold by International Rectifier Corporation.

It will be understood that this invention is not limited to the examples given herein by way of illustration, but only by the scope of the appended claims.

What is claimed is:

1. A security unit to protect a telephone line from unauthorized outgoing calls from a telephone unit including a base telephone, said security unit comprising in combination:

means comprising an access limiter and bypass circuit interposed in series circuit relation between said base telephone and said telephone line;

means comprising a ring detector circuit constructed to be connected in circuit relation between said telephone line and said access limiter and bypass circuit for detecting incoming telephone call ring signals; and access enabling means connected in circuit relation with said ring detector circuit and said access limiter and bypass circuit, constructed when said telephone unit is off-hook to block said access limiter and bypass circuit to normal telephone communication including outgoing telephone calls and dial information between said base telephone unit and said telephone line in response to a first condition, and to unblock said access limiter and bypass circuit to said normal telephone communication including outgoing telephone calls and dial information between said base telephone and said telephone line in response to a second condition, wherein said means comprises said ring detector circuit and is responsive to the incoming telephone signals whether or not said access limiter and bypass circuit is unblocked to outgoing calls.

2. The combination in accordance with claim 1 wherein said access enabling means comprises means mechanically operable to block or unblock said access limiter circuit between said base telephone unit and said telephone line.

3. The combination in accordance with claim 1 wherein said access enabling means comprises means electrically operable to block or unblock said access limiter circuit between said base telephone unit and said telephone line.

4. The combination in accordance with claim 3 wherein said access enabling means is electronically actuated in response to an access signal generated by said telephone unit comprising a pulse series sequence in a pattern representing a digit sequence in a pre-selected order.

5. A security unit to protect a telephone line from unauthorized outgoing calls from a telephone unit including a base telephone, said security unit comprising in combination:
- means comprising an access limiter and bypass circuit interposed in circuit relation between said base telephone and said telephone line;
- means comprising a ring detector circuit constructed to be connected in circuit relation between said telephone line and said access limiter and bypass circuit for detecting incoming telephone calls; and
- access enabling means connected in circuit relation with said ring detector circuit and said access limiter and bypass circuit, constructed when said telephone unit is off-hook to block said access limiter and bypass circuit to outgoing telephone calls and dial information between said base telephone unit and said telephone line in response to a first condition, and to unblock said access limiter and bypass circuit to outgoing telephone calls and dial information between said base telephone and said telephone line in response to a second condition;
- which includes gating means connected to said ring detector circuit and said access enabling means, wherein the telephone line between said base telephone and said telephone line is responsive to incoming telephone signals whether or not said access limiter and bypass circuit is unblocked to outgoing calls;
- wherein said access enabling means comprises means electrically operable to block or unblock said access limiter circuit between said base telephone unit and said telephone line;
- wherein said access enabling means is electronically actuated in response to an access signal generated by said telephone unit comprising a pulse series sequence in a pattern representing a digit sequence in a preselected order;
- wherein said electronic access enabling means comprises in combination:
- an access pulse detector/shaper circuit connected to receive the pulsed output from said base telephone;
- a timing and logic circuit means connected to be triggered by the pulse series input from said access pulse detector/shaper circuit;
- a digital pulse counter constructed to operate in response to signals from said timing and logic circuit means to count through a series of digits from zero through nine;
- data distributor means connected in circuit relation with said digital pulse counter, and having a pre-set circuit configuration corresponding to the digit sequence of said access signal;
- sequential latch and counter means comprising a plurality of latches corresponding to the number of series in said pulse series sequence, connected in sequential circuit relation to said data distributor means, each said latch being disposed, in turn, to register exclusively a count dictated by the pre-set circuit configuration of said data distributor means, and to transmit a triggering signal to the next latch in the sequence whenever said prior latch receives, in order, a pulse series from said pulse detector/shaper corresponding to the count which said counter is disposed to register, the last latch in the sequence being disposed when its count is registered to generate an output signal; and
- gating means in circuit relation with said sequential latch and counter means, and responsive to said output signal therefrom to unblock said access limiter and bypass circuit.

6. The combination in accordance with claim 5 wherein said access signal comprises a sequence of N series of pulses corresponding to N digits, and said sequential latch and counter circuit includes means for transmitting to said timing and logic circuit a disabling signal whenever all N series of the said sequence have been received from said base telephone and registered by said sequential latch and counter circuit.

7. A security unit to protect a telephone line from unauthorized outgoing calls from a telephone unit including a base telephone, said security unit comprising in combination:
- means comprising an access limiter and bypass circuit interposed in circuit relation between said base telephone and said telephone line;
- means comprising a ring detector circuit constructed to be connected in circuit relation between said telephone line and said access limiter and bypass circuit for detecting incoming telephone calls; and
- access enabling means connected in circuit relation with said reing detector circuit and said access limiter and bypass circuit, constructed when said telephone unit is off-hook to block said access limiter and bypass circuit to outgoing telephone calls and dial information between said base telephone unit and said telephone line in response to a first condition, and to unblock said access limiter and bypass circuit to outgoing telephone calls and dial information between said base telephone and said telephone line in response to a second condition;
- wherein said ring detector circuit comprises in combination:
- a first electron discharge means in series with resistance means, and constructed to break down and become conducting in response to a standard telephone ringing signal $V_r$;
- a second discharge device connected to be triggered by said first electron discharge device to become conducting and to delvelop a preselected voltage $V_e$, said second electron discharge device connected through a resistance to charge up a capacitance to provide across said capacitance an enabling voltage signal to said access limiter circuit, said resistance-capacitance circuit having a time constant not exceeding seven seconds, unidirectional circuit means being connected in said resistance-capacitance circuit to prevent said capacitance from discharging through said first electron discharge device; and wherein said access limiter and bypass circuit comprises in combination means for blocking a current path from being completed between said telephone line and said base telephone when said telephone is in off-hook condition, said means comprising an electron discharge device, which is normally non-conducting, and which is constructed, when triggered, to conduct at a pre-set voltage, said electron discharge device connected between said telephone line and said base telephone in parallel with unidirectional circuit means adapted to bypass only said ringing signal to said base telephones; and means responsive to an access enabling signal from said access enabling means to trigger said electron discharge device to become conducting, unblocking said current path.

8. The method of protecting a telephone line connected to a telephone set, including a base unit, from unauthorized outgoing calls which comprises a security circuit connected in circuit relation between said base telephone and said telephone line, which performs the steps of:

blocking the reception of outgoing calls between said telephone and said telephone line in response to an off-hook transition of said telephone set;

utilizing said telephone to generate an access signal comprising N sequential pulse series, corresponding to N digits, wherein each of the pulses in each said series has a duration which does not exceed a time interval $t_e$, and wherein each said series of pulses is separated from the remaining series of pulses by a time interval at least exceeding $t_e$;

detecting and producing a count of the pulses in a first series of pulses in said access signal during a time interval $t_1$;

if the first count corresponds to a first preselected digit of said access signal, distributing and latching said first count and generating a reset signal;

subsequently detecting and producing a count of the pulses in a second series during a time interval $t_2$;

if said second count corresponds to a second preselected digit of said access signal, distributing and latching said second count, and generating a reset signal;

repeating the foregoing process for each count until the count of pulses has been completed in said Nth series during a time interval $t_n$, assuming each prior count has corresponded to a preselected digit of said access signal; and if said Nth count corresponds to an Nth preselected digit of said access signal, distributing and latching said Nth count, generating a disable signal so that no more series can be counted, and also generating an unblocking signal for unblocking said telephone line to outgoing calls initiated from said base telephone.

9. The method in accordance with claim 8 wherein if the Nth count, together with any preceding counts fails to correspond to the preselected digits of said access signal in proper sequence, a disabled signal is generated so that no more series can be counted.

* * * * *